US012695195B2

(12) United States Patent
Chang et al.

(10) Patent No.: US 12,695,195 B2
(45) Date of Patent: Jul. 28, 2026

(54) ANTENNA STRUCTURE AND ELECTRONIC DEVICE

(71) Applicant: Wistron NeWeb Corporation, Hsinchu (TW)

(72) Inventors: Chia-Hao Chang, Hsinchu (TW); Chung-Che Lien, Hsinchu (TW); Tzu-Kuan Sun, Hsinchu (TW); Ting-Han Shih, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 41 days.

(21) Appl. No.: 18/897,300

(22) Filed: Sep. 26, 2024

(65) Prior Publication Data

US 2025/0112370 A1 Apr. 3, 2025

(30) Foreign Application Priority Data

Sep. 28, 2023 (TW) ................................ 112137440

(51) Int. Cl.
*H01Q 9/04* (2006.01)
*H01Q 1/02* (2006.01)

(52) U.S. Cl.
CPC ............ *H01Q 9/0414* (2013.01); *H01Q 1/02* (2013.01); *H01Q 9/045* (2013.01)

(58) Field of Classification Search
CPC ............ H01Q 1/02; H01Q 1/48; H01Q 5/371; H01Q 9/0414; H01Q 9/045; H01Q 9/42
See application file for complete search history.

(56) References Cited

U.S. PATENT DOCUMENTS

| | | | | |
|---|---|---|---|---|
| 5,861,716 A * | 1/1999 | Ogura | H01J 23/05 | 313/344 |
| 11,817,624 B1 * | 11/2023 | Ehresmann | H01Q 21/0025 | |
| 2006/0071859 A1 * | 4/2006 | Condon | H01Q 1/2258 | 343/700 MS |
| 2009/0167201 A1 * | 7/2009 | Duelli | H05B 41/2806 | 315/248 |
| 2012/0242545 A1 * | 9/2012 | Chiang | H01Q 9/42 | 343/700 MS |
| 2015/0372376 A1 * | 12/2015 | Le | H01Q 1/405 | 343/872 |
| 2020/0403555 A1 * | 12/2020 | Mills | H02S 10/30 | |
| 2021/0175596 A1 * | 6/2021 | Migliorino | H01Q 1/02 | |
| 2022/0352647 A1 * | 11/2022 | Tang | H01P 3/121 | |
| 2023/0163441 A1 * | 5/2023 | Kim | H01Q 21/065 | 343/872 |
| 2024/0079755 A1 * | 3/2024 | Kim | H01Q 1/246 | |

* cited by examiner

*Primary Examiner* — Thien M Le
(74) *Attorney, Agent, or Firm* — McClure, Qualey & Rodack, LLP

(57) ABSTRACT

An antenna structure is disposed on a heat sink. The heat sink includes a plurality of cooling fins. The antenna structure includes a feeding source, a connecting member connected to the feeding source, and an antenna unit. The feeding source is located between two of the adjacent cooling fins. The antenna unit includes a radiation portion connected to the connecting member, a first segment, a second segment, and a third segment. The first segment and the second segment are connected to the radiation portion. The second segment is arranged in alignment with the first segment and a distance apart from the cooling fins. The third segment is connected to the feeding source and overlaps with at least one of the cooling fins.

20 Claims, 8 Drawing Sheets

ANTENNA STRUCTURE AND ELECTRONIC DEVICE

CROSS-REFERENCE TO RELATED PATENT APPLICATION

This application claims the benefit of priority to Taiwan Patent Application No. 112137440, filed on Sep. 28, 2023. The entire content of the above identified application is incorporated herein by reference.

BACKGROUND

Technical Field

The present disclosure relates to an antenna structure and an electronic device, and more particularly, to an antenna structure disposed on a heat sink and an electronic device having the antenna structure.

Description of Related Art

As the function and performance requirements of electronic devices increase, the location and size of the antenna in the electronic device are compressed in the limited space provided by the electronic device. At the same time, the bandwidth required by antennas is getting broader, and so the space utilization of antennas in electronic devices is very important.

From this, developing an antenna structure located in the dead space or awkward space around the heat sink and being able to couple with the heat sink to increase antenna bandwidth and an electronic device having such antenna structure is a goal in the related industry.

SUMMARY

It is an aspect of the present disclosure to provide an antenna structure that is disposed on a heat sink having a plurality of cooling fins and includes a feeding source, a connecting member, and an antenna unit. The feeding source is located between two adjacent cooling fins. The connecting member is connected to the feeding source. The antenna unit includes a radiation portion, a first segment, a second segment, and a third segment. The radiation portion is connected to the connecting member. The first segment is connected to the radiation portion. The second segment is connected to the radiation portion, and is arranged in alignment with the first segment and a distance apart from the cooling fins. The third segment is connected to the feeding source and overlaps with at least one of the cooling fins.

It is another aspect of the present disclosure to provide an electronic device that includes a housing, a heat sink, and an antenna structure. The housing includes a first body part and a second body part opposite the first body part. The heat sink is disposed on the first body part and includes a plurality of cooling fins. The antenna structure includes a feeding source, a connecting member, and an antenna unit. The feeding source is located between two adjacent cooling fins. The connecting member is connected to the feeding source. The antenna unit includes a radiation portion, a first segment, a second segment, and a third segment. The radiation portion is connected to the connecting member. The first segment is disposed on the second body part and connected to the radiation portion. The second segment is disposed on the second body part and connected to the radiation portion, and the second segment is arranged in alignment with the first segment and a distance apart from the cooling fins. The third segment is connected to the feeding source and overlaps with at least one of the cooling fins.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
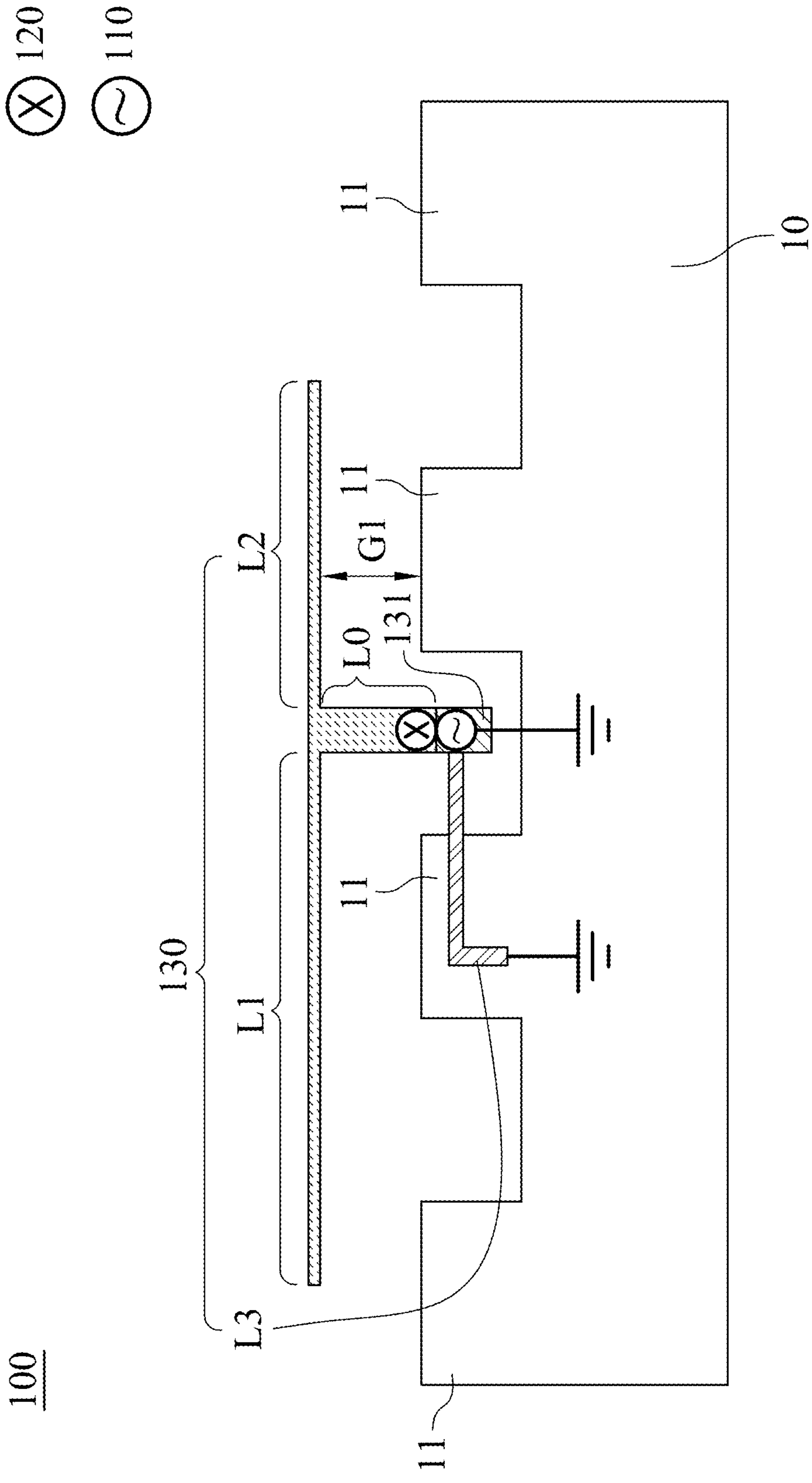
FIG. 1 is a schematic view of an antenna structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In the present disclosure, when an element (i.e. a unit or a module) is described to "connect" to another element, it means to that the element is directly connected to the other element, or that certain element is indirectly connected to the other element, which implies that there is another element between the element and the other element. When an element is described to "directly connect" to another element, it means to no other element is between the element and the other element.

Referring to FIG. 1, FIG. 1 is a schematic view of an antenna structure 100 according to a first embodiment of the present disclosure. The antenna structure 100 is disposed on a heat sink 10, and the heat sink 10 includes a plurality of cooling fins 11. The antenna structure 100 includes a feeding source 110, a connecting member 120, and an antenna unit 130. The feeding source 110 is located between two of the cooling fins 11 that are adjacent to each other. The connecting member 120 is connected to the feeding source 110. The antenna unit 130 includes a radiation portion L0, a first segment L1, a second segment L2, a third segment L3, and a bridge portion 131. The radiation portion L0 is connected to the feeding source 110 through the connecting member 120. In other words, the radiation portion L0 is connected to the connecting member 120. The first segment L1 and the second segment L2 are connected to the radiation portion L0, and more specifically, one end of the first segment L1 is connected to the radiation portion L0, and one end of the second segment L2 is connected to the radiation portion L0. The second segment L2 and the first segment L1 are arranged along a straight line, and there is a distance G1 between the second segment L2 and the cooling fins 11. In other words, the second segment L2 is arranged in alignment with the first segment L1 and a distance G1 apart from the cooling fins 11. The third segment L3 is connected to the feeding source 110 and overlaps with at least one of the cooling fins 11. The feeding source 110 is disposed on the bridge portion 131 and connected to the connecting member 120, but the present disclosure is not limited thereto. In other embodiments, the feeding source 110 and the connecting member 120 can be disposed on the bridge portion 131 and be connected directly or through the bridge portion 131.

Specifically, the connecting member can be a thimble, and the antenna unit 130 can be a planar inverted-F antenna (PIFA). The first segment L1 and the second segment L2 are strip-shaped and form a T-shape with the radiation portion L0. The third segment L3 is L-shaped, but the present disclosure is not limited thereby. The feeding source 110 and the connecting member 120 are both located between two cooling fins 11 of the heat sink 10. The third segment L3 is connected to a grounding layer (not labeled in the drawing). The distance G1 is greater than or equal to 3 mm. Thus, the antenna structure 100 of the present disclosure couples with the cooling fins 11 of the heat sink to increase the bandwidth and improve performance.

Figure 2:
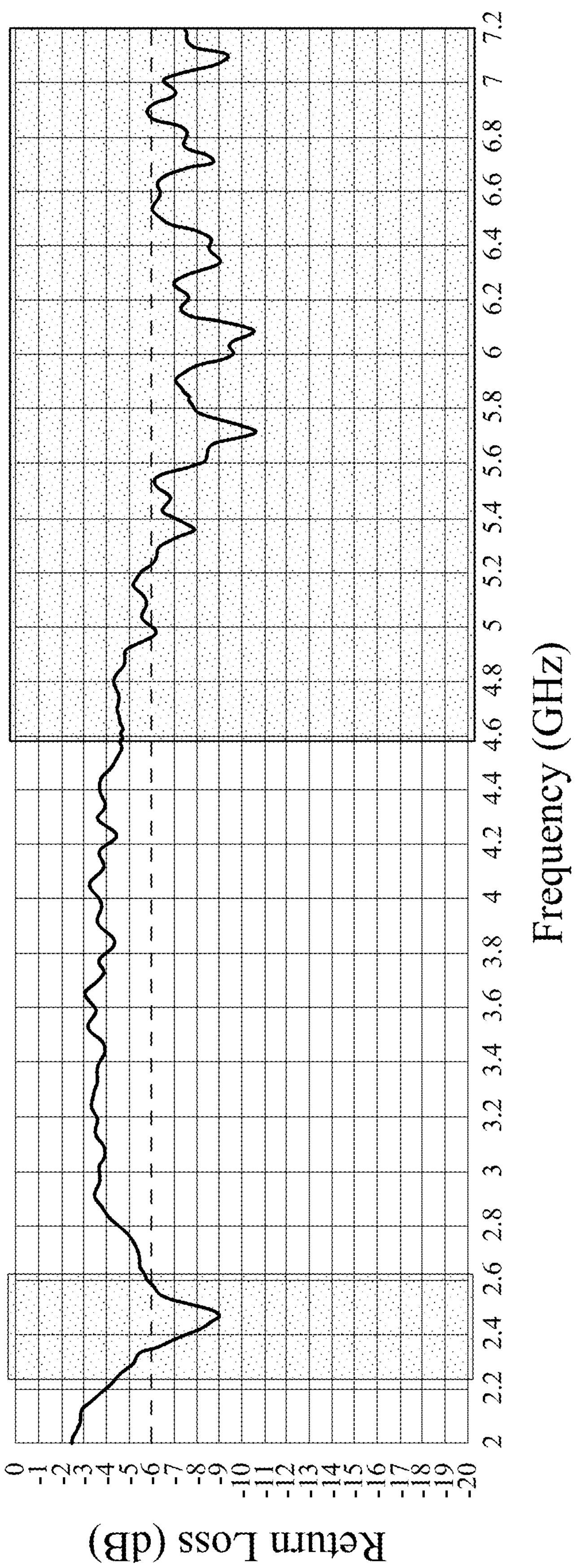
FIG. 2 is a schematic graph illustrating a return loss of the antenna structure shown in FIG. 1.

FIG. 2 is a schematic graph illustrating the return loss of the antenna structure 100 shown in FIG. 1. Referring to FIG. 1 and FIG. 2, the curve shows the corresponding return loss value (dB) of the antenna structure 100 at different frequencies (GHz). The performance of the antenna structure 100 is better when the restore loss is less than −6 dB, and so the performance of the antenna structure 100 at different frequencies can be observed. The antenna structure 100 has a first resonance frequency band and a second resonance frequency band, and the first resonance frequency band is lower than the second resonance frequency band. The first resonance frequency band corresponds to the low-frequency band (2.4 GHZ) of WiFi 6E, and the second resonance frequency band corresponds to the high-frequency band (5 GHZ) of WiFi 6E. In particular, the length of the first segment L1 corresponds to one half (0.5) of the wavelength of the first resonance frequency band, and the length of the second segment L2 corresponds to one quarter (0.25) of the wavelength of the second resonance frequency band. The radiation portion L0 is used for impedance matching the first resonance frequency band and the second resonance frequency band.

Figure 3:
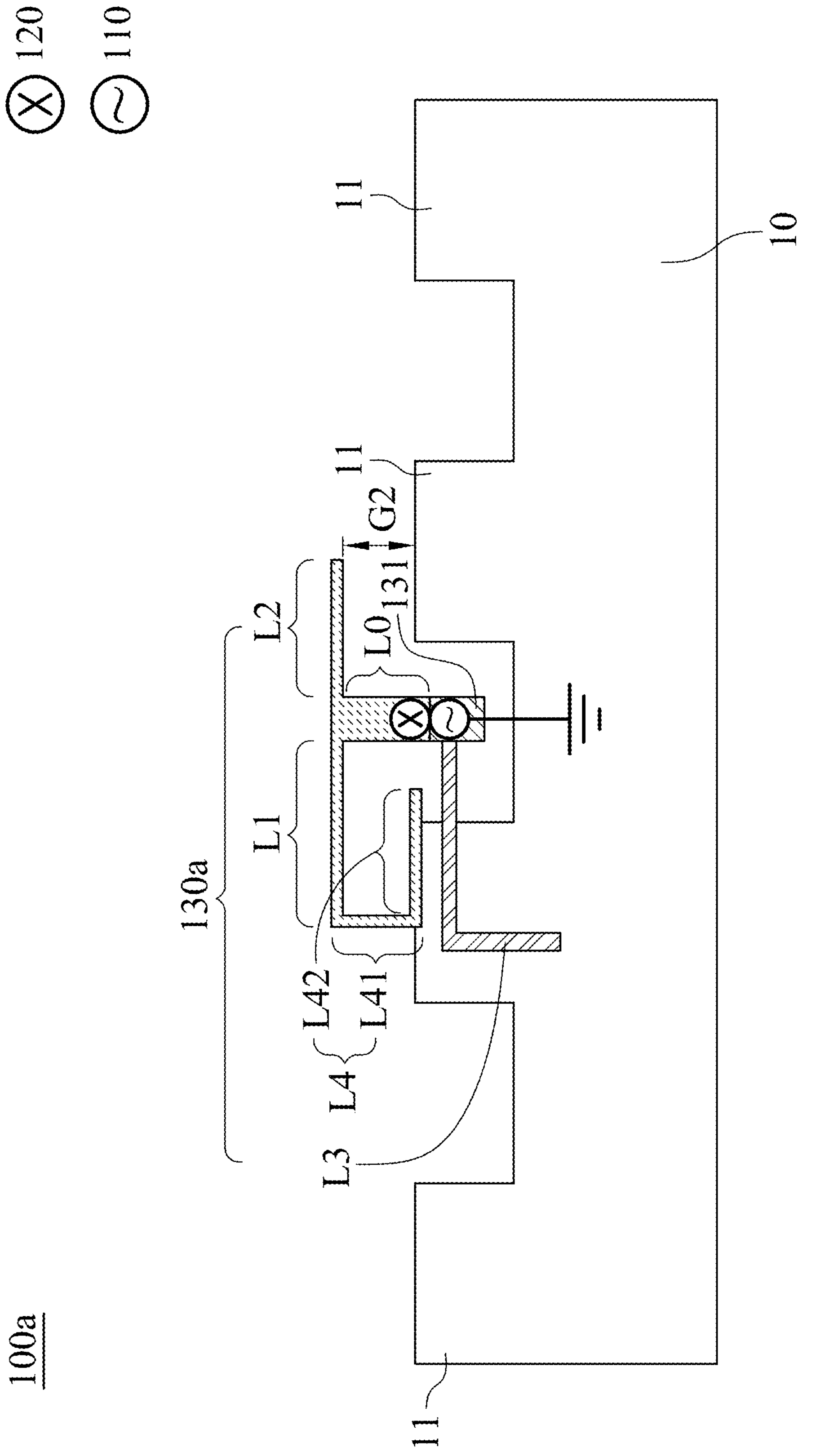
FIG. 3 is a schematic view of an antenna structure according to a second embodiment of the present disclosure.

Referring to FIG. 3, which is a schematic view of an antenna structure 100*a* according to a second embodiment of the present disclosure, the antenna structure 100*a* is disposed on a heat sink 10. The heat sink 10 includes a plurality of cooling fins 11. The antenna structure 100*a* includes a feeding source 110, a connecting member 120, and an antenna unit 130*a*. In the second embodiment, the heat sink 10, the cooling fins 11, the feeding source 110, and the connecting member 120 are structurally similar to the heat sink 10, the cooling fins 11, the feeding source 110, and the connecting member 120 of the first embodiment, and therefore will not be described herein. Compare to the antenna structure 100 of the first embodiment, the antenna unit 130*a* of the antenna structure 100*a* further comprises a fourth segment L4. The fourth segment L4 is connected to another end of the first segment L1 and overlaps with the heat sink 10. In addition, the distance G2 between the second segment L2 and the cooling fins 11 is greater than or equal to 1 mm. The antenna structure 100*a* can be a monotype antenna.

In specific, the fourth segment L4 includes two branch segments L41, L42. The shape of the fourth segment L4 can be an elongated strip or a bent shape formed by two branch segments L41, L42. When the fourth segment L4 is bent into two branch segments L41, L42, the two branch segments L41, L42 are partially overlapped with the cooling fins 11, thereby reducing the overall size of the antenna structure 100*a*. Moreover, by adjusting the overlapping area of the fourth segment L4 and the cooling fins 11 or adjusting the length of the second segment L2, the coupling area between the antenna structure 100*a* and the cooling fins 11 of the heat sink 10 can be adjusted so as to adjust the high-frequency coupling of the antenna structure 100*a*.

Figure 4:
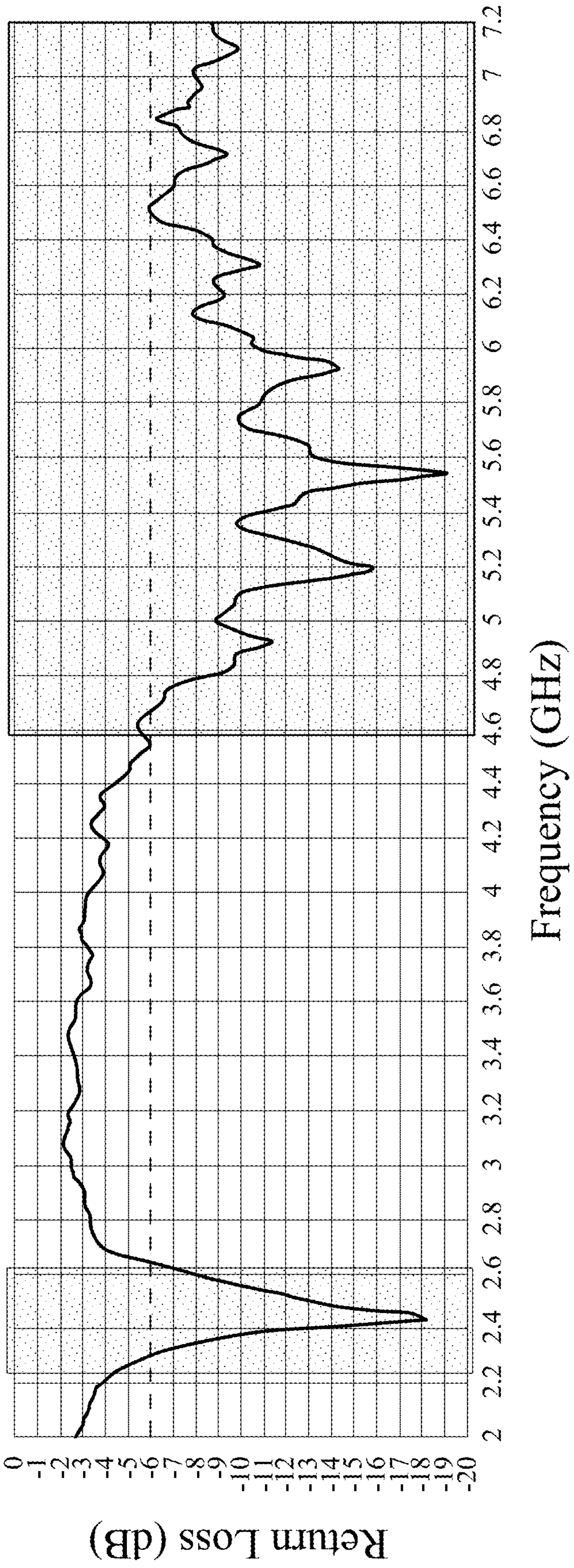
FIG. 4 is a schematic graph illustrating a return loss of the antenna structure shown in FIG. 3.

FIG. 4 is a schematic graph illustrating the return loss of the antenna structure 100*a* shown in FIG. 3. Referring to FIG. 3 and FIG. 4, the antenna structure 100*a* has a first resonance frequency band and a second resonance frequency band, and the first resonance frequency band is lower than the second resonance frequency band. The sum of the length of the first segment L1 and the length of the fourth segment L4 corresponds to one quarter (0.25) of the wavelength of the first resonance frequency band. The first resonance frequency band is between 2.3 GHZ and 2.6 GHZ, and the second resonance frequency band is between 5 GHz and 7.125 GHZ.

Figure 5:
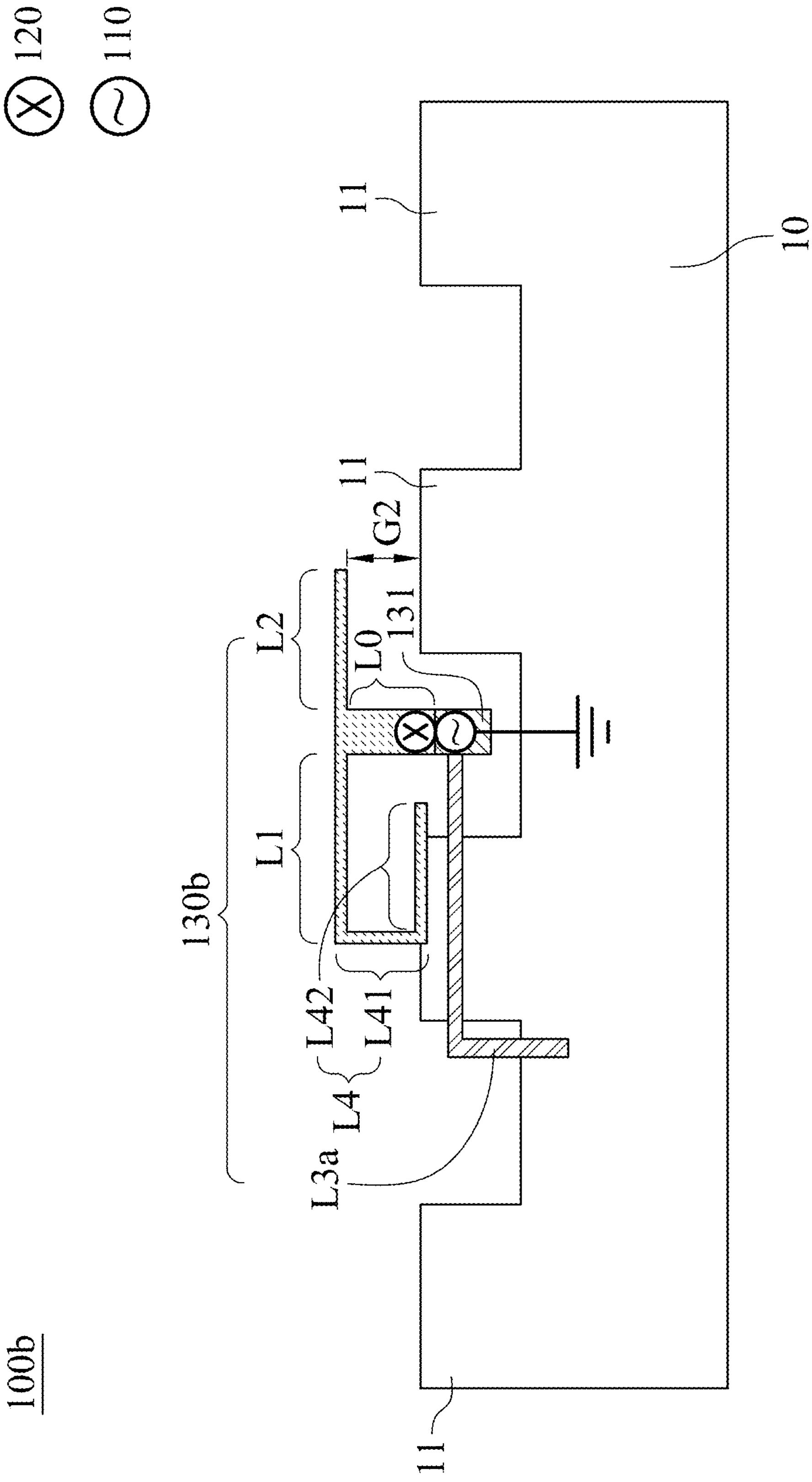
FIG. 5 is a schematic view of an antenna structure according to a third embodiment of the present disclosure.

Referring to FIG. 5, which is a schematic view of an antenna structure 100*b* according to a third embodiment of the present disclosure, the antenna structure 100*b* is disposed on a heat sink 10. The heat sink 10 includes a plurality of cooling fins 11. The antenna structure 100*b* includes a feeding source 110, a connecting member 120, and an antenna unit 130*b*. In the third embodiment, the feeding source 110 and the connecting member 120 of the antenna structure 100*b* are similar to the feeding source 110 and the connecting member 120 of the second embodiment, and therefore is not described herein. The position and length of the third segment L3*a* of the antenna unit 130*b* can be adjusted according to the required bandwidth of the antenna structure 100*b*. Moreover, by adjusting the length of the third segment L3*a* and the overlapping area between the third segment L3*a* and the cooling fins 11, a better bandwidth matching is achieved. Hence, the antenna structure 100*b* of the present disclosure achieves the coupling matching of the low-frequency band and the high-frequency band through adjusting the coupling area between the antenna structure 100*b* and the heat sink 10, so as to increase the bandwidth of the low-frequency band and the high-frequency band while improving the performance of the antenna structure 100*b* at the low frequency band and the high frequency band and reducing the size of the antenna structure 100*b*.

Figure 6A:
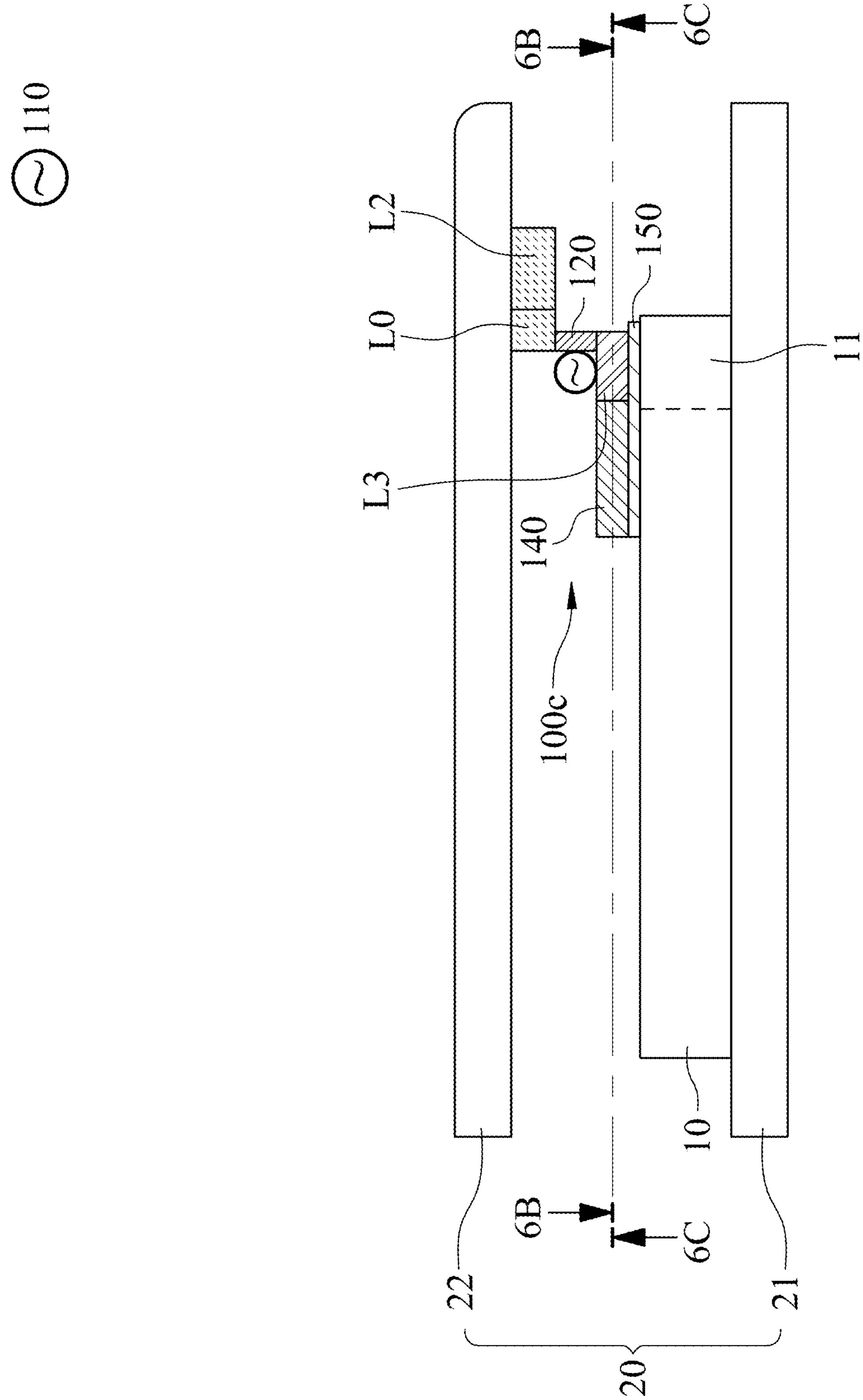
FIG. 6A is a schematic view of an electronic device according to a fourth embodiment of the present disclosure.
Figure 6B:
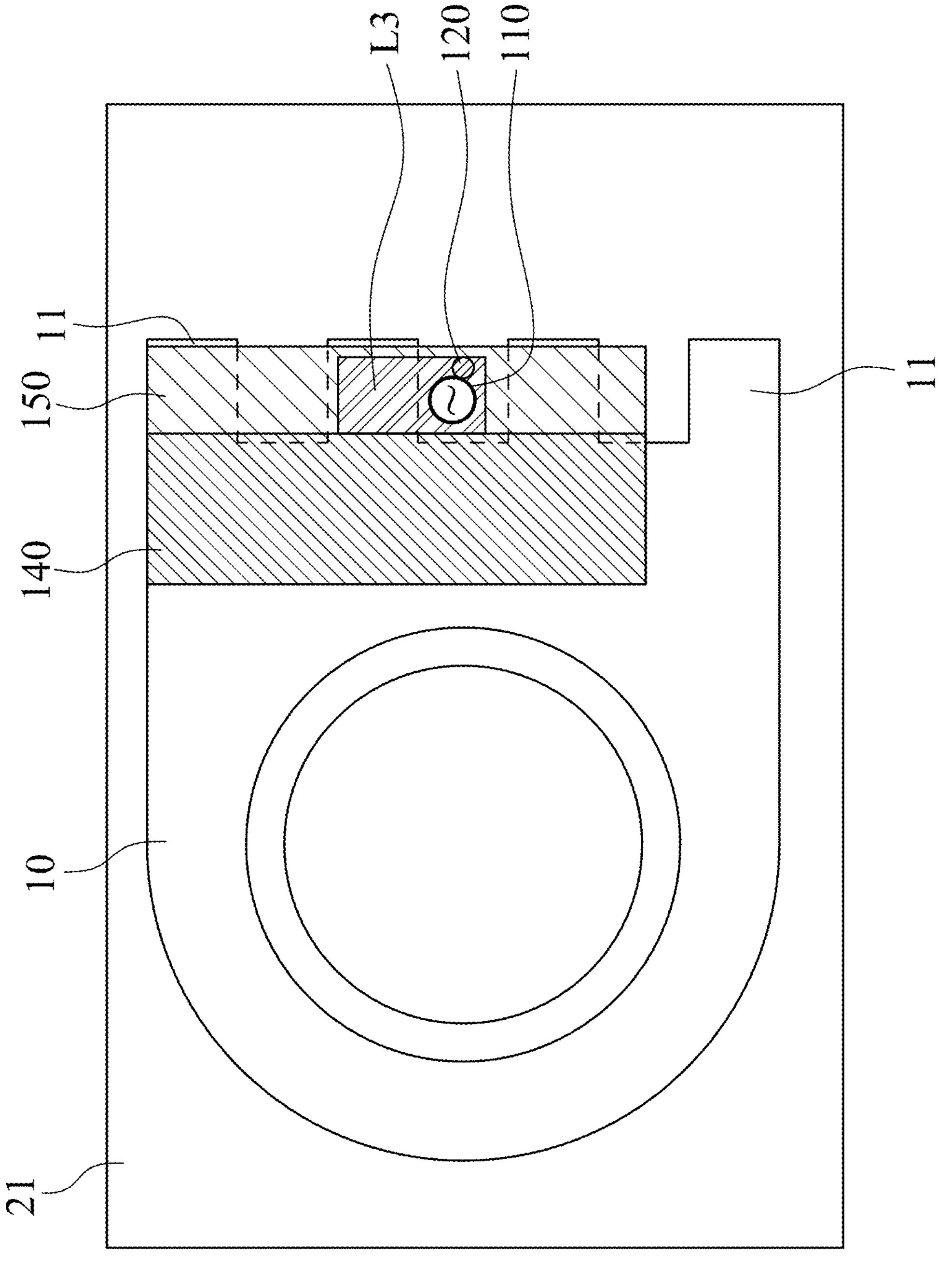
FIG. 6B is a schematic cross-sectional view along line 6B-6B of the electronic device of FIG. 6A.
Figure 6C:
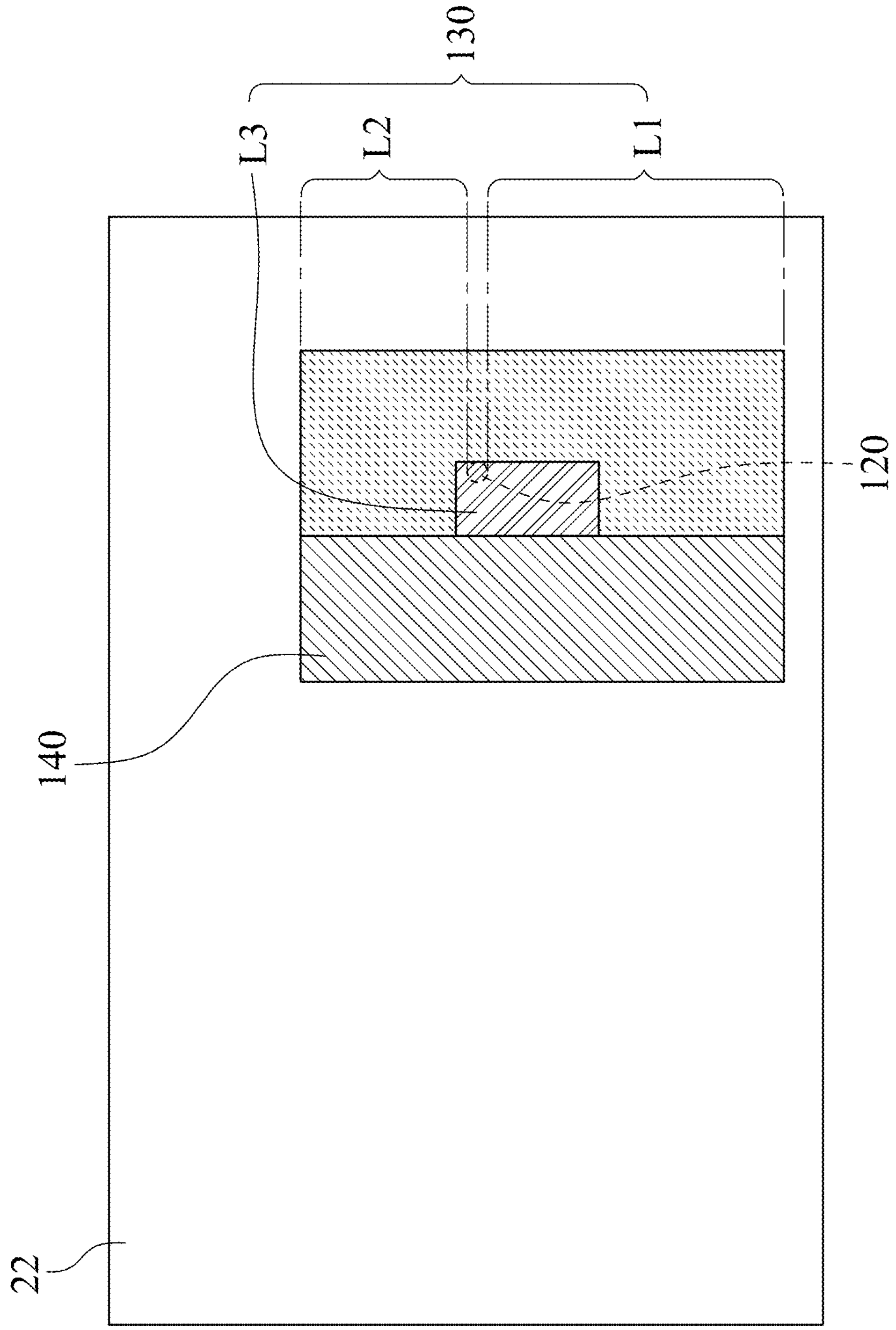
FIG. 6C is a schematic cross-sectional view along line 6C-6C of the electronic device of FIG. 6A.

FIG. 6A is a schematic view of an electronic device 200 according to a fourth embodiment of the present disclosure. FIG. 6B is a schematic cross-sectional view along line 6B-6B of the electronic device 200 of FIG. 6A. FIG. 6C is a schematic cross-sectional view along line 60-6C of the electronic device 200 of FIG. 6A. Referring to FIG. 6A to FIG. 6C, the electronic device 200 includes a housing 20, a heat sink 10, and an antenna structure 100*c*. The housing 20 includes a first body part 21 and a second body part 22. The second body part 22 is opposite to the first body part 21. The heat sink 10 is disposed on the first body part 21 and includes a plurality of cooling fins 11. The antenna structure 100*c* includes a feeding source 110, a connecting member 120, and an antenna unit 130. The feeding source 110 is disposed between two adjacent cooling fins 11. The connecting member 120 is connected to the feeding source 110. The antenna unit 130 includes a radiation portion L0, a first segment L1, a second segment L2, a third segment L3, and a bridge portion (not shown). The first segment L1 is disposed on the second body part 22 and connected to the radiation portion L0, and in specific, one end of the first segment L1 is connected to the radiation portion L0. The second segment L2 is disposed on the second body part 22 and connected to the radiation portion L0, and in specific, one end of the second segment L2 is connected to the radiation portion L0. The second segment L2 and the first segment L1 are arranged in alignment along a straight line. There is a distance between the second segment L2 and the cooling fins 11. In other words, the second segment L2 is arranged in alignment with the first segment L1 and a distance apart from the cooling fins 11. The third segment L3 is connected to the feeding source 110 and overlaps with at least one of the cooling fins 11. The feeding source 110 is disposed on the bridge portion and connected to the connecting member 120, but the present disclosure is not limited thereto. In other embodiments, the feeding source 110 and the connecting member 120 can be disposed on the bridge portion and are connected directly or through the bridge portion.

In the fourth embodiment, the antenna structure 100*c* is structurally similar to the antenna structure 100 of the first embodiment, and so will not be described herein. The electronic device 200 can be a notebook computer, and the first body part 21 and the second body part 22 can respective be the c cover and d cover of the notebook computer, but the present disclosure is not limited thereto. In specific, the antenna structure 100*c* further includes a grounding layer 140 and a circuit board 150. The circuit board 150 is disposed on the heat sink 10. The grounding layer 140, the third segment L3, and the feeding source 110 are disposed on the circuit board 150. The connecting member 120 is placed vertically on the third segment L3 from the first body part 21 toward the second body part 22 and is connected to the first segment L1 and the second segment L2 that are disposed on the second body part 22. Thus, by placing the antenna structure 100*c* in the dead spaces or awkward spaces of the electronic device 200, the size of the antenna structure 100*c* for placement can be increased, and the frequency bandwidth is increased as well as the performance is improved.

In view of the above, the present disclosure has the following advantages. First, the antenna structure of the present disclosure couples with the cooling fins of the heat sink to increase bandwidth and improve performance. Second, by adjusting the coupling area between the antenna structure and the heat sink, the antenna structure of the present disclosure achieves coupling matching in the low-frequency and high-frequency bands, which helps in increasing the bandwidth of the low-frequency and high-frequency bands, improving the performance of the antenna structure in the low-frequency and high-frequency bands, and reducing the size of the antenna structure. Third, by arranging the antenna structure in a dead space of the electronic device of the present disclosure, the installable volume of the antenna structure is increased, thereby increasing the antenna bandwidth and improving antenna efficiency at the same time.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure to be disposed on a heat sink having a plurality of cooling fins, the antenna structure comprising:
- a feeding source located between two adjacent ones of the plurality of cooling fins;
- a connecting member connected to the feeding source; and
- an antenna unit comprising:
  - a radiation portion connected to the connecting member;
  - a first segment connected to the radiation portion;
  - a second segment connected to the radiation portion, wherein the second segment is arranged in alignment with the first segment and a distance apart from the plurality of fins; and
  - a third segment connected to the feeding source and overlapping with at least one of the plurality of cooling fins.

2. The antenna structure according to claim 1, wherein a first resonance frequency band of the antenna structure is lower than a second resonance frequency band of the antenna structure, and a length of the first segment corresponds to one half of a wavelength of the first resonance frequency band.

3. The antenna structure according to claim 2, wherein a length of the second segment corresponds to one quarter of a wavelength of the second resonance frequency band.

4. The antenna structure according to claim 2, wherein the distance is greater than or equal to 3 mm.

5. The antenna structure according to claim 2, wherein the third segment is connected to a grounding layer.

6. The antenna structure according to claim 1, wherein one end of the first segment is connected to the radiation portion, and the antenna unit further comprises:
- a fourth segment connected to another end of the first segment and overlapping with the heat sink.

7. The antenna structure according to claim 6, wherein a first resonance frequency band of the antenna structure is lower than a second resonance frequency band of the antenna structure, and a sum of a length of the first segment and a length of the fourth segment corresponds to one quarter of a wavelength of the first resonance frequency band.

8. The antenna structure according to claim 6, wherein the distance is greater than or equal to 1 mm.

9. The antenna structure according to claim 7, wherein the first resonance frequency band is between 2.3 GHz and 2.6 GHz, and the second resonance frequency band is between 5 GHz, and 7.125 GHz.

10. The antenna structure according to claim 1, wherein the connecting member is a thimble.

11. An electronic device comprising:

a housing comprising:

a first body part; and a second body part opposite the first body part;

a heat sink disposed on the first body part and comprising a plurality of cooling fins; and an antenna structure comprising:

a feeding source located between two adjacent ones of the plurality of cooling fins;

a connecting member connected to the feeding source; and an antenna unit comprising:

a radiation portion connected to the connecting member;

a first segment disposed on the second body part and connected to the radiation portion;

a second segment disposed on the second body part and connected to the radiation portion, wherein the second segment is arranged in alignment with the first segment and a distance apart from the plurality of cooling fins; and a third segment connected to the feeding source and overlapping with at least one of the plurality of cooling fins.

12. The electronic device according to claim 11, wherein a first resonance frequency band of the antenna structure is lower than a second resonance frequency band of the antenna structure, and a length of the first segment corresponds to one half of a wavelength of the first resonance frequency band.

13. The electronic device according to claim 12, wherein a length of the second segment corresponds to one quarter of a wavelength of the second resonance frequency band.

14. The electronic device according to claim 12, wherein the distance is greater than or equal to 3 mm.

15. The electronic device according to claim 12, wherein the third segment is connected to a grounding layer, and the grounding layer is disposed on the heat sink.

16. The electronic device according to claim 12, wherein one end of the first segment is connected to the radiation portion, and the antenna unit further comprises:

a fourth segment connected to another end of the first segment and overlapping with the heat sink.

17. The electronic device according to claim 16, wherein a first resonance frequency band of the antenna structure is lower than a second resonance frequency band of the antenna structure, and a sum of a length of the first segment and a length of the fourth segment corresponds to one quarter of a wavelength of the first resonance frequency band.

18. The electronic device according to claim 16, wherein the distance is greater than or equal to 1 mm.

19. The electronic device according to claim 12, wherein the first resonance frequency band is between 2.3 GHz and 2.6 GHz, and the second resonance frequency band is between 5 GHz and 7.125 GHz.

20. The electronic device according to claim 11, wherein the connecting member is a thimble.

* * * * *